though the reaction conditions to which the respective feeds can be subjected can be identical. These conditions are well known and are widely variable. Temperatures of about 600° to about 1050° F. are suitable and the preferred range is from about 800° to about 950° F. Within these temperature limits weight space velocities of about 0.05 to about 10.0 pounds of naphtha, per hour, per pound of catalyst in the reaction zone can be employed advantageously; however, space velocities of about 0.25 to about 5.0 provide the best results. Hydrogen which is saturated with water vapor should be introduced into the reforming reactor at rates running from about 0.5 to about 20.0 mols of hydrogen per mol

United States Patent Office 3,565,789
Patented Feb. 23, 1971

3,565,789
INITIATING A CATALYTIC REFORMING PROCESS
Paul F. Lovell, Wilmington, Del., assignor to Sun Oil Company, Philadelphia, Pa., a corporation of New Jersey
No Drawing. Continuation-in-part of application Ser. No. 666,982, Sept. 11, 1967. This application June 6, 1969, Ser. No. 831,255
Int. Cl. C10g 35/08
U.S. Cl. 208—138
12 Claims

ABSTRACT OF THE DISCLOSURE

This invention relates to a process for initiating the reforming of a petroleum naphtha feed containing less than 10 parts per million sulfur under saturated conditions. By this invention, the reforming catalyst is initially contacted under reforming conditions with a naphtha feed containing between 10 and 300 parts per million sulfur.

---

This application is a continuation-in-part of my copending application, Ser. No. 666,982, filed Sept. 11, 1967, now abandoned.

This invention relates to the reforming of hydrocarbon fractions boiling essentially in the naphtha and gasoline ranges containing low surfur concentrations. The advent of improved reforming-feed pretreating catalysts has given rise to the use, in the reforming process, of feeds which contain extremely small concentrations of sulfur. These feeds contain below 10 parts per million (p.p.m.) sulfur down to as little as substantially no sulfur, i.e., less than 1 p.p.m. The present invention is concerned with an improved method of initiating catalytic reforming processes which utilize such feeds.

Hydrocarbon fractions in the naphtha and gasoline boiling ranges may be generally improved by catalytic reforming. One of the more popular catalysts used in reforming is the conventional platinum-on-alumina type which generally contains about 0.1 to 2.0 weight percent platinum as the dehydrogenation promoter. It is well known that sulfur acts as a severe poison to these catalysts, inhibiting their dehydrogenation activity and enhancing their acidic function. These effects promote cracking and higher temperatures, both of which shorten catalyst life.

In contrast, although it is known that platinum is poisoned by sulfur in the feed, it is advantageous to treat the catalyst just before use with limited amounts of sulfur containing compounds to reduce the rate of reduction in activity in the subsequent reforming. For example, United States Patent 2,863,825 teaches pretreating a platinum type catalyst with hydrogen containing a compound selected from the group consisting of hydrogen sulfide and sulfur compounds which yield hydrogen sulfide at a concentration of between 0.005 and 5 percent by volume.

This invention is to be further distinguished from United States Patent 3,330,761, which relates to a process for improving the selectivity of platinum group metal reforming catalysts under conditions of desiccated reforming through the inclusion of a nitrogen compound. The patentees do disclose a severe pretreatment of the catalyst under desiccated conditions with a feed containing 100 to 300 p.p.m. sulfur to reduce exothermic reactions during startup.

It has now been found that in the reforming under saturated conditions of feeds which contain extremely low concentrations of sulfur it is particularly advantageous to initially contact the catalyst under reforming conditions with a feed containing between 10 and 300 p.p.m. sulfur. It has surprisingly been found that such initial contacting substantially increases catalyst activity over the activity of a catalyst used in reforming extremely low sulfur containing feed without such pretreatment.

The exact nature of the function of the pretreatment in increasing activity is not known but it is not the same as that of beneficial sulfiding as conducted in the 2,863,825 patent or in other prior art because exposure of the catalyst to the sulfur providing components is substantially different. Firstly, the sulfur concentration in the treating medium of the present invention is substantnally less than that taught in prior art, allowing only a substantially smaller degree of contact between the catalyst and the sulfur containing compounds. Secondly, the pretreatment of the present invention provides a substantial increase in initial catalyst activity. While the known catalyst pretreatments may reduce the rate of decline of catalyst activity, very little, if any, initial increase in activity is obtained.

The present invention can be described as an improvement to a process for reforming under saturated conditions petroleum naphtha feeds containing less than 10 p.p.m. preferably less than 5 p.p.m., sulfur which comprises initiating the reforming by contacting the reforming catalyst under reforming conditions with a naphtha feed containing between 10 and 300 p.p.m. sulfur. Saturated conditions is herein defined to mean that the reaction zone vapors are saturated with moisture at room temperature, such that the hydrogen recycle will generally contain greater than 800 parts per million by weight of water.

In the process of the present invention, as in a conventional reforming process employing a catalyst, the reaction zones can be brought onstream from an inactive to an active condition by first passing hot hydrogen or hydrogen-rich gas through the reaction zones in contact with the zones until the zones and catalyst beds are at the desired temperature for the pretreatment. The flow of hydrogen is continued and vaporized pretreatment stock is added thereto to initiate reforming.

The conditions of the pretreat or initial contacting step can be the same or different from those of the subsequent reforming of the feed of less sulfur content. In this specification the feed of 10 to 300 p.p.m. sulfur content will be referred to as the pretreatment feed and the feed containing less than 10 p.p.m. sulfur, preferably less than 5 p.p.m., will be referred to as the reforming feel al of hydrocarbon reactants. While the total reaction pressure in the reforming may be maintained at any value between about 50 and about 1000 pounds per square inch gauge (p.s.i.g.), the best results are obtained by holding the reaction pressure within the range between about 100 and about 750 p.s.i.g. In any event, the reaction conditions should be adjusted to effect a net production of hydrogen in the reaction.

The time required for pretreating the catalyst depends somewhat on the sulfur concentration in the pretreat feeds and on the flow rate. In most instances a relatively short time is sufficient but if desired the treatment can be continued for a longer period so long as the pretreat contacting is sufficient to increase initial catalyst activity. The time under usualy conditions will be up to 24 hours, preferably for 2 to 15 hours. During the treatment the temperature can be kept constant or practically so within the limits indicated supra but it is also possible to begin pretreatment at a relatively low temperature, say about 550° to 750° F., gradually increasing the temperature during treatment to, for example, 900° to 950° F.

The catalyst used is any of the conventional type platinum-on-alumina catalysts which generally contain between about 0.1 to 2.0 percent platinum. Catalysts of this type are available commercially and are extensively described in the literature. The catalyst compositions can include various active forms of alumina, such as gamma, eta, and kappa, and the aluminas may vary considerably in surface characteristics depending upon how the catalyst is made. The combination of platinum and the alumina produces a catalyst having a plurality of function whereby such reactions as dehydrogenation, isomerization, cyclization and hydrocracking are promoted. In some cases a minor amount of a halogen, such as chlorine or fluorine, is incorporated in the catalyst to control the catalytic activity for promoting certain types of these reactions.

The hydrocarbon stock employed in the pretreat step can suitably be a portion of the petroleum naphtha subsequently to be employed in the reforming operation so long as the pretreat naphtha contains between 10 and 300 p.p.m. sulfur and the reforming feed contains less than 10 p.p.m. sulfur. As the sulfur content of the pretreat feed approaches 300 p.p.m. sulfur the increase in initial catalyst activity during the subsequent reforming becomes less so that the advantages of the present invention are not obtained when the pretreat feed contains above 300 p.p.m. sulfur. Preferably the pretreat feed contains between 10 and 30 p.p.m. sulfur and the reforming feed contains less than 5 p.p.m. sulfur. If desired, the pretreat feed can be a different petroleum fraction than the reforming feed. It can be a hydrocarbon feed boiling in the naphtha range or a fraction thereof or a hydrocracked naphtha or a fraction thereof, or a mixture of such fractions. The charging stock should have an ASTM boiling range end point below about 325° F. preferably below about 375° F.

Any process known in the art can be used to reduce the sulfur content of either the pretreat feed or the reforming feed to the respective, desired level. For example, the feeds can be hydrodesulfurized over a nickel-molybdenum-alumina catalyst such as that disclosed in British patent specification, 1,024,317, with conditions varied to give a pretreat feed and a forming feed of respective, desired sulfur content. The catalyst used to desulfurize the feeds can be the same for both feeds or can be different catalysts. For example, the pretreat feed can be hydrodesulfurized over a conventional cobalt-molybdenum catalyst and the reforming feed desulfurized over a nickel-molybdenum catalyst.

After pretreating the platinum catalyst, under the conditions described for the period of up to 24 hours, preferably for 2 to 15 hours, the lower sulfur containing feed is charged into the reaction zones and reforming is continued under saturated conditions substantially the same as those during pretreatment. As will be illustrated by the following examples, the pretreatment of the present invention increases initial catalyst activity and in combination with the reforming of low sulfur feeds gives improved catalyst stability.

TABLE 1.—CHARGE STOCK INSPECTIONS

| Type | I, pretreated with CoMo catalyst to 13 p.p.m. sulfur | II, severely pretreated with NiMo catalyst to <1 p.p.m. sulfur | III, severely pretreated with NiMo catalyst to <1 p.p.m. sulfur |
|---|---|---|---|
| API | 51.8 | 51.7 | 54.6 |
| IBP | 246 | 250 | 206 |
| 5 | 267 | 268 | 228 |
| 10 | 273 | 274 | 232 |
| 30 | 291 | 290 | 244 |
| 50 | 308 | 308 | 256 |
| 70 | 328 | 328 | 266 |
| 90 | 357 | 356 | 287 |
| 95 | 370 | 370 | 300 |
| EP | 402 | 394 | 343 |
| Percent recovered | 98 | 98 | 98 |
| Sulfur, p.p.m. | 13 | 1 | 1 |
| Nitrogen, p.p.m. | 1 | 1 | 1 |
| Paraffins | 47.9 | 49.3 | 44.6 |
| Naphthene | 38.4 | 36.0 | 40.8 |
| Olefins | 0.6 | 0.5 | 1.9 |
| Aromatics | 13.1 | 14.2 | 12.7 |

EXAMPLES I TO VI

A naphtha containing 13 p.p.m. sulfur, with the properties indicated in Column I of Table I, was used to pretreat a 0.6 percent platinum-alumina catalyst at a temperature of 900° F., a pressure of 550 p.s.i.g., a liquid hourly space velocity of 1.5 and a hydrogen to charge mol. ratio of 8 to 1 for a period of 10 hours. The hydrogen recycle gas contains about 1000 p.p.m. by weight of water. This pretreatment procedure was then repeated using fresh identical catalyst and under identical conditions but with a pretreat charge containing <1 p.p.m. sulfur. The properties of this charge are indicated in Column II of Table I.

A naphtha, with the properties shown in Table I, Column III and containing less than 1 p.p.m. sulfur, was subjected to reforming over the catalysts pretreated with the respected sulfur containing feeds. The naphtha was reformed at temperatures of 900°, 920° and 940° F. over the catalyst, pretreated with the stock of Column I, Table I. The results of these runs are shown as Run Numbers 4, 5 and 6 of Table II. Another portion of the charge with the properties shown in Table I, Column III and containing less than 1 p.p.m. sulfur, was subjected to reforming at temperatures of 900°, 920° and 940° F. over the catalysts pretreated with a stock of Column II, Table I. The results of these runs are shown as Run Numbers 1, 2 and 3 of Table II.

The runs as reported in Table II show the increase in activity obtained by pretreating a platinum catalyst according to the present invention preliminary to reforming an extremely low sulfur containing feed over reforming the feed without pretreatment of catalyst. Comparing Run 1 with Run 4, Run 2 with Run 5 and Run 3 with Run 6, it is seen that inital catalyst activity is significantly increased as indicated by the significant increase in octane of reformate when the catalyst is pretreated with the feed of Runs 4, 5 and 6 containing 13 p.p.m. sulfur.

TABLE II

| | Run Number | | | | | |
|---|---|---|---|---|---|---|
| | 1 | 2 | 3 | 4 | 5 | 6 |
| Pressure, p.s.i.g | 350 | 350 | 350 | 350 | 350 | 350 |
| Temperature, °F | 900 | 920 | 940 | 900 | 920 | 940 |
| Liquid hourly space velocity, v./hr./v | 1.5 | 1.5 | 1.5 | 1.5 | 1.5 | 1.5 |
| $H_2$ to hydrocarbon ratio, m./m. | 8/1 | 8/1 | 8/1 | 8/1 | 8/1 | 8/1 |
| Catalyst distribution | 9:18:73 | 9:18:73 | 9:18:73 | 9:18:73 | 9:18:73 | 9:18:73 |
| Reformate: | | | | | | |
| Research octane number | 90.4 | 93.7 | 97.9 | 96.8 | 101.0 | 102.9 |
| $H^2$ in high pressure separator gas molecular percent | 89.1 | 88.3 | 85.1 | 88.2 | 84.4 | 82.1 |

The present invention combines the advantages of a pretreatment of a platinum catalyst with a medium sulfur content feed to give increased initial catalyst activity with the advantage of the increased catalyst stability obtained in reforming a severely low sulfur containing feed.

What is claimed is:

1. In a process for reforming a naphtha feed under saturated conditions wherein the hydrogen recycle will contain over 800 p.p.m. of water which feed contains less than 10 p.p.m. sulfur, which process comprises subjecting said feed to reforming conditions in the presence of a platinum-on-alumina catalyst, the improvement of bringing the process on stream from an initial state which comprises contacting said catalyst with a naphtha feed containing between 10 and 300 p.p.m. sulfur at a temperature of between 600 to 1050° F., at a weight space velocity of about 0.05 to about 10.0 pounds of feed per hour, per pound of catalyst, at a reaction pressure within the range of between 50 and 1000 p.s.i.g. for a period sufficient to increase initial catalyst activity.

2. The process of claim 1 in which said catalyst is contacted with a naphtha feed containing between 10 and 30 p.p.m. sulfur.

3. The process of claim 1 in which said contacting is for a period of up to 24 hours.

4. The process of claim 1 in which said contacting is for a period of 2 to 15 hours.

5. The process of claim 1 in which said contacting is at a temperature between 800° to 950° F., at a weight space velocity of between about 0.25 to 5.0 pounds of feed per hour, per pound of catalyst, and at a reaction pressure within the range of between about 100 and 700 p.s.i.g.

6. The process of claim 1 in which said contacting comprises contacting said catalyst with a naphtha feed containing between 10 and 30 p.p.m. sulfur at a temperature between 800° to 950° F., at a weight space velocity of between about 0.25 to 5.0 pounds of feed per hour, per pound of catalyst, and at a reaction pressure within the range of between about 100 and 700 p.s.i.g. for a period sufficient to increase initial catalyst activity.

7. The process of claim 6 in which the improvement is to a process for reforming a naphtha feed which contains less than 5 p.p.m. sulfur.

8. The process of claim 6 in which said contacting is for a period of 2 to 15 hours.

9. The process of claim 7 in which said contacting is for a period of 2 to 15 hours.

10. In a process for reforming a naphtha feed under saturated conditions wherein the hydrogen recycle will contain over 800 p.p.m. of water which feed contains less than 10 p.p.m. sulfur, which process comprises subjecting said feed to reforming conditions in the presence of a platinum-on-alumina catalyst, the improvement of bringing the process on stream from an initial state which comprises contacting said catalyst with a hydrocracked naphtha feed containing between 10 and 300 p.p.m. sulfur at a temperature of between 600 to 1050° F., at a space velocity of about 0.05 to about 10.0 pounds of feed per hour, per pound of catalyst, at a reaction pressure within the range of between 50 and about 1000 p.s.i.g. for a period sufficient to increase initial catalyst activity.

11. The process of claim 10 wherein said hydrocracked naphtha has a boiling range end point below about 325° F.

12. The process of claim 10 wherein the hydrocracked naphtha contains between 10 and 30 p.p.m. sulfur.

References Cited

UNITED STATES PATENTS

| 2,642,383 | 6/1953 | Berger et al. | 208—139 |
| 2,642,384 | 6/1953 | Cox | 208—139 |
| 2,863,825 | 12/1958 | Engel | 208—138 |
| 2,969,319 | 1/1961 | Sosnowski et al. | 208—139 |
| 3,330,761 | 7/1967 | Capsuto et al. | 208—138 |
| 3,415,737 | 12/1968 | Kluksdahl | 208—138 |

HERBERT LEVINE, Primary Examiner